US012587120B2

(12) United States Patent
Saber et al.

(10) Patent No.: US 12,587,120 B2
(45) Date of Patent: Mar. 24, 2026

(54) CONTROL OF A ROTATING ELECTRIC MACHINE

(71) Applicant: SAFRAN ELECTRICAL & POWER, Blagnac (FR)

(72) Inventors: Christelle Saber, Moissy-Cramayel (FR); Najib Rouhana, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 193 days.

(21) Appl. No.: 18/702,099

(22) PCT Filed: Oct. 18, 2022

(86) PCT No.: PCT/FR2022/051966
§ 371 (c)(1),
(2) Date: Apr. 17, 2024

(87) PCT Pub. No.: WO2023/067278
PCT Pub. Date: Apr. 27, 2023

(65) Prior Publication Data
US 2024/0413773 A1 Dec. 12, 2024

(30) Foreign Application Priority Data
Oct. 19, 2021 (FR) ........................................ 2111101

(51) Int. Cl.
H02P 21/18 (2016.01)
H02P 25/026 (2016.01)

(52) U.S. Cl.
CPC ............ H02P 21/18 (2016.02); H02P 25/026 (2013.01); H02P 2205/07 (2013.01)

(58) Field of Classification Search
CPC .... H02P 21/18; H02P 25/026; H02P 2205/07; H02P 6/17; H02P 23/18; H02P 6/16; H02P 2203/00
See application file for complete search history.

(56) References Cited

U.S. PATENT DOCUMENTS

2018/0052009 A1 2/2018 Kim
2021/0211079 A1* 7/2021 Jian .......................... H02P 27/12
2022/0158577 A1* 5/2022 Beciu ....................... H02P 23/14

FOREIGN PATENT DOCUMENTS

FR 3104856 A1 6/2021
JP 2003274700 A * 9/2003 .............. H02P 21/18
WO 2021/121770 A1 6/2021

OTHER PUBLICATIONS

Search Report for International Application No. PCT/FR2022/051966 mailed Jan. 17, 2023.

* cited by examiner

*Primary Examiner* — Bickey Dhakal
(74) *Attorney, Agent, or Firm* — McDonald Hopkins LLC

(57) ABSTRACT

A method and a system for determining control parameters of a rotating electric machine, including: a two-phase imaginary reference frame module configured to construct two imaginary two-phase signals ($x_\alpha$, $x_\beta$) based on a measurement of the mechanical position $\theta_{meca}$ of the axis of a rotor of the rotating machine received from a position sensor, an open-loop module configured to determine in open loop an estimate of the electrical speed, so-called the open-loop estimated electrical speed $\omega_{est_{fit}}$, using the imaginary two-phase signals, a phase-locked loop module configured to generate the actual electrical position $\theta$ of the rotating machine from the two imaginary two-phase signals ($x_\alpha$, $x_\beta$) and using the open-loop estimated electrical speed $\omega_{est_{fit}}$ received from the open-loop module.

12 Claims, 6 Drawing Sheets

1

CONTROL OF A ROTATING ELECTRIC MACHINE

CROSS-REFERENCE TO RELATED APPLICATIONS

This is the National Stage application of PCT international application PCT/FR2022/051966, filed on Oct. 18, 2022, which claims the priority of French Patent Application No. 2111101, filed Oct. 19, 2021, both of which are incorporated herein by reference in their entireties.

TECHNICAL FIELD

The present invention relates to the field of control of rotating electric machines.

PRIOR ART

An electric machine may be used in all industrial fields. For example, some electric machines having a high torque, a low inertia and rapid responses are advantageously used in the motorization of actuators, in particular in on-board systems of an aircraft.

In general, an electric machine, for example an electric motor, is equipped with a control or piloting device intended to adjust the voltage at its terminals according to the feedback electrical data and especially of an accurate piece of data on the angular position θ of the rotor. This information usually originates from a resolver or position sensor often mounted on the shaft of the electric machine in order to measure the mechanical angle $\theta_{meca}$ (in rad) of the rotor, also called the mechanical position.

The mechanical position measured by the resolver forms a primary input piece of data for piloting the electric machine. Indeed, the electrical position $\theta_{\text{□□□□}}$ which is derived therefrom is used to perform reference frame transformations (for example, Park and inverse Park transforms) associated with piloting of the electric machine.

Furthermore, this information on the mechanical position is used to estimate the mechanical rotational speed and to perform the reference frame changes at the control level. Usually, a derivative is used to estimate the mechanical speed from the measurement of the mechanical position of the rotor. The electrical speed $\omega_{\text{□□□□}}$ deduced from the mechanical speed can be used at the control level of the machine to ensure the decoupling between the axes d and q in a rotating synchronous reference frame (d,q).

Nonetheless, the position signal generated by the resolver is not clean in the sense that it contains harmonics which might have a vibratory origin on the shaft of the electric machine and which could possibly superpose with signals derived from a Resolver-to-Digital Converter (RDC) converter.

Furthermore, the conventional calculation of the mechanical speed based on the calculation of a derivative of the mechanical position θ contains the same harmonics. Any frequency harmonic that superposes with these two quantities, the position and the speed, could generate torque vibrations on the shaft and additional iron and copper losses in the electric machine.

A state-of-the-art solution consists in using digital low-pass filters to attenuate the harmonic content of these two speed and position signals. However, the information on the speed might be attenuated because quite often the considered harmonics in question are of a low frequency nature. Indeed, in order to be effective, the cut-off frequency selected for the low-pass filter should be close to the continuous signal, at zero frequency. Furthermore, the information on the angle might be delayed because of the delay generated by the phase shift of the digital low-pass filter. Both these consequences could jeopardize the stability and feasibility of the control of the electric machine.

Consequently, an object of the present invention is to propose a method and a system for determining the control parameters (position and speed), overcoming the aforementioned drawbacks, allowing for a high accuracy in determining an electrical position with no harmonics and with no phase shift with respect to the mechanical position, thereby enabling an electric machine to be piloted with great stability and great reliability.

DISCLOSURE OF THE INVENTION

The present invention relates to a method for determining control parameters of a rotating electric machine, including the following steps:

measuring the mechanical position $\theta_{\text{□□□□}}$ of the axis of a rotor of the rotating machine, constructing two imaginary two-phase signals $x_\alpha$, $x_\beta$ based on the measurement of said mechanical position, determining in open-loop an estimate of the electrical speed, so-called open-loop estimated electrical speed $\omega_{est_{fit}}$, using said imaginary two-phase signals, injecting said two imaginary two-phase signals $x_\alpha$, $x_\beta$ and said open-loop estimated electrical speed $\omega_{est_{fit}}$ into a phase-locked loop, and generating by said phase-locked loop, the actual electrical position θ of the rotating machine.

This method allows determining the electrical angular position with great accuracy, with no harmonics and with no phase shift with respect to the measured position of the axis of the rotor of the rotating machine.

The mechanical position $\theta_{\text{□□□□}}$ may be measured by a position sensor mounted on the shaft of the electric machine.

Advantageously, the construction of said two imaginary two-phase signals includes the following steps:

calculating an estimate of an electrical position, so-called the estimated electrical position $\theta_{\text{□□□□}}$ by multiplying the mechanical position $\theta_{\text{□□□□}}$ by the number p of pole pairs of the electric machine, and calculating from said estimated electrical position $\theta_{\text{□□□□}}$ two sinusoidal signals normalized and shifted from each other by 90° thereby forming said two imaginary two-phase signals.

Advantageously, the determination of the estimated electrical speed $\omega_{est_{fit}}$ includes the following steps:

generating two pulse signals at zero crossings of said imaginary two-phase signals $x_\alpha$, $x_\beta$, determining a preliminary estimate of an electrical speed, so-called the preliminary electrical speed $\omega_{est}$, from the sum of said two pulse signals and a maximum useful electrical frequency associated with a maximum rotational speed, and determining the open-loop estimated electrical speed $\omega_{est_{fit}}$ by applying a selective band-pass filter on said preliminary electrical speed $\omega_{est}$.

Advantageously, the determination of said two pulse signals includes the following steps:

transforming the two sinusoidal imaginary two-phase signals into square signals with a predetermined width, and generating said two pulse signals by detecting changes in the rising and falling edges of said square signals.

Advantageously, the generation by said phase-locked loop of the actual electrical position $\theta$ of the rotating machine includes the following steps:

applying a rotation matrix to the imaginary two-phase signals $x_\alpha$, $x_\beta$ to extract a continuous component $x_{\bar{d}}$ of the imaginary signal along the axis d of a rotating synchronous reference frame, servo-controlling the continuous component $x_{\bar{d}}$ at a zero $x^*_d$ setpoint, determining a corrector y based on the deviation between said setpoint and said continuous component, determining an estimate of a phase-locked electrical speed $\omega_{PLL}$, by adding said corrector y to the open-loop estimated $\omega_{estflt}$ electrical speed, determining an estimate of a preliminary angular position $\vartheta_\nu$ by integrating said phase-locked electrical speed $\omega_{PLL}$, and determining the actual electric position of the electric machine by compensating for a delay in the estimate of the preliminary angular position $\vartheta_\nu$ of the shaft of the electric machine.

Advantageously, according to a first embodiment, the method includes determining an actual electrical speed $\omega$ of the electric machine by applying low-pass active filtering to the phase-locked electrical speed $\omega_{PLL}$.

Advantageously, according to a second embodiment, the method includes determining an actual electrical speed $\omega$ of the electric machine by applying a selective band-pass active filtering on the continuous component $x_{\bar{d}}$ of the imaginary signal according to the axis d of the rotating synchronous reference frame, the actual electrical speed then $\omega$ corresponding to the phase-locked electrical speed $\omega_{PLL}$.

Advantageously, according to a third embodiment, the method includes determining an actual electrical speed $\omega$ of the electric machine by applying a speed observer to the actual electrical position of the electric machine, the actual electrical speed $\omega$ then corresponding to an image of the filtered electrical speed obtained by said speed observer.

The invention also relates to a method for controlling a rotating machine comprising determining control parameters according to the preceding aspect.

The invention also relates to a system for determining control parameters of a rotating electric machine, including:

a two-phase imaginary reference frame module configured to construct two imaginary two-phase signals ($x_\alpha$, $x_\beta$) based on a measurement of the mechanical position $\theta_{mmm}$ of the axis of a rotor of the rotating machine received from a position sensor, an open-loop module configured to determine in open-loop an estimate of the electrical speed, so-called open-loop estimated electrical speed $\omega_{estflt}$, using said imaginary two-phase signals, a phase-locked loop module configured to generate the actual electrical position $\theta$ of the rotating machine from said two imaginary two-phase signals ($x_\alpha$, $x_\beta$) and using said open-loop estimated electrical speed $\omega_{estflt}$ received from the open-loop module.

The invention also relates to a device for piloting a rotating electric machine including the system for determining electrical parameters according to the features hereinabove.

The invention also relates to a rotating electric machine including the piloting device according to the features hereinabove.

BRIEF DESCRIPTION OF THE FIGURES

Other features and advantages of the invention will appear upon reading preferred embodiments of the invention made with reference to the appended figures, wherein.

DESCRIPTION OF THE EMBODIMENTS

The concept of the invention is to perform a digital processing on the measurement signal of the mechanical position of the axis of the rotor of an electric machine by creating an imaginary two-phase reference frame and using this two-phase reference frame as input data of a phase-locked loop to generate a harmonic-free resultant position. Furthermore, this locked loop is also used to calculate the speed.

Figure 1:
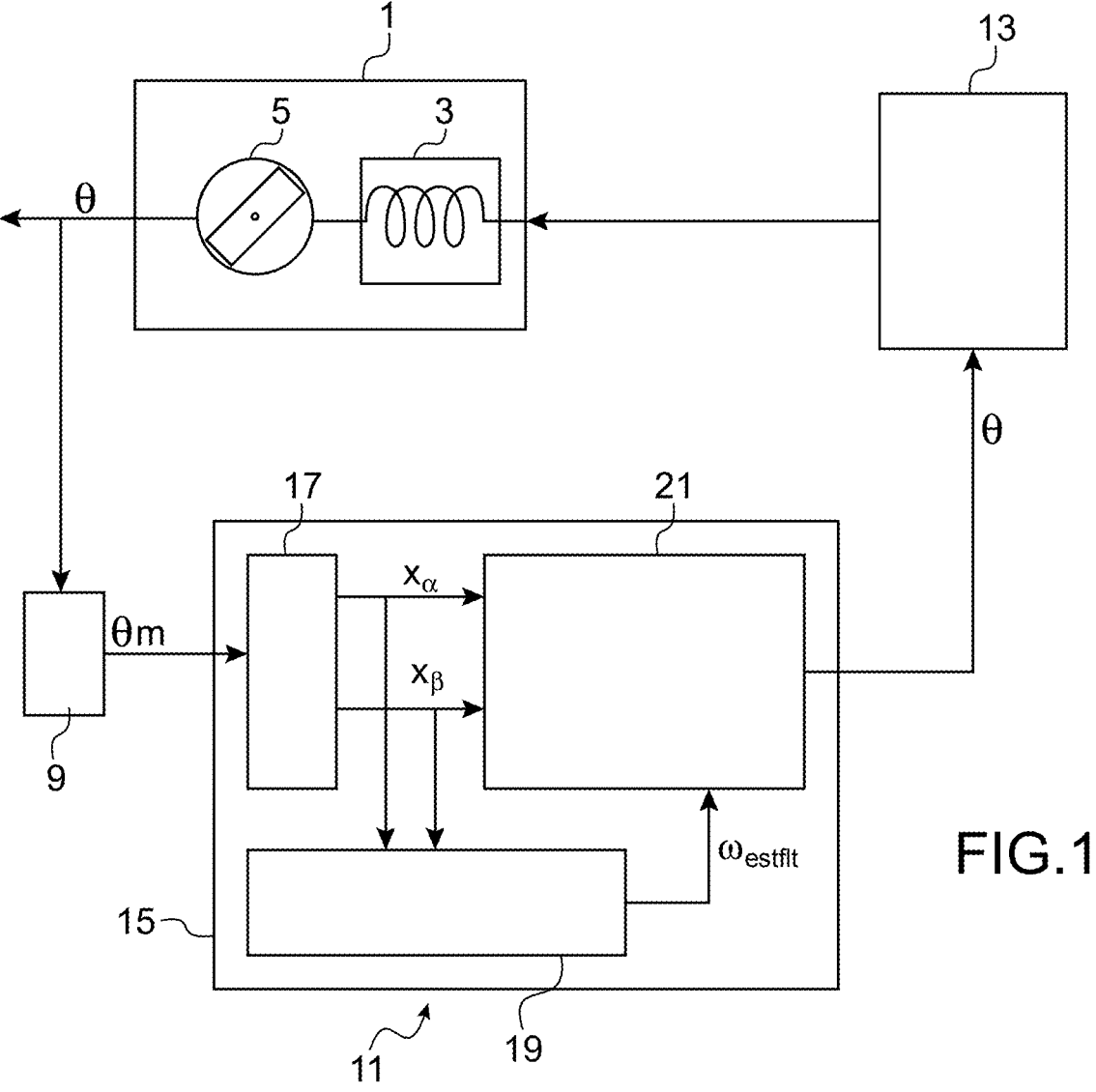
FIG. 1 schematically illustrates a rotating electric machine including a system for determining control parameters of the electric machine, according to an embodiment of the invention.

FIG. 1 schematically illustrates a rotating electric machine including a system for determining control parameters of the electric machine, according to an embodiment of the invention.

The rotating electric machine 1 (in motor mode or in generator mode) usually includes stator windings 3 and a rotor 5 with p pole pairs (only one pair is illustrated, i.e. p=1).

A resolver or a position sensor 9 (for example, a Hall-effect sensor) is mounted on the shaft of the electric machine 1 to measure the mechanical position $\theta_{\bar{m}}$ of the axis of the rotor 5.

In accordance with the invention, the electric machine 1 is equipped with a system 11 for determining control parameters. This system 11 receives the signal of the mechanical position $\theta_{\bar{m}}$ measured by the position sensor 9 to filter the low-frequency harmonics that might be present in this signal without introducing a phase shift.

Thus, the control parameter determination system 11 transmits to a control device 13 useful signals on the $\theta$ position of the rotor and possibly on the rotational speed with no harmonics.

The control device 13 uses the clean signals received from the control parameter determination system 11 as well as usual feedback electrical data to control or pilot the operating point of the electric machine 1 according to the actual position $\theta$ of the rotor 5.

The control parameter determination system 11 includes an electronic circuit 15 configured to carry out a filtering digital processing on the signal of the mechanical position $\theta_{\overline{a}}$ measured by the position sensor 9. The angular position resulting from this processing is then harmonic-free. The electronic circuit 15 is also configured to calculate the resulting mechanical speed without repercuting the harmonics and without attenuating the signal.

According to an embodiment of the invention, the electronic circuit 15 includes a two-phase imaginary reference frame module 17, an open-loop module 19, and a phase-locked loop module 21.

The two-phase imaginary reference frame module 17 is configured to construct two imaginary two-phase signals ($x_\alpha$, $x_\beta$) based on the measurement of the mechanical position $\theta_{\overline{a}}$.

The open-loop module 19 is configured to determine an estimate of the electrical speed, so-called open-loop estimated electrical speed $\omega_{est_{fit}}$, using the imaginary two-phase signals ($x_\alpha$, $x_\beta$).

The two imaginary two-phase signals ($x_\alpha$, $x_\beta$) and the open-loop estimated electrical speed $\omega_{est_{fit}}$ are injected into the phase-locked loop module 21. The latter 21 uses the imaginary two-phase signals ($x_\alpha$, $x_\beta$) as input data to determine the electrical position of the electric machine while using the open-loop estimated electrical speed $\omega_{est_{fit}}$ to improve the dynamics of the position servo-control. This enables the phase-locked loop module 21 to generate a very accurate and harmonic-free actual electrical position $\theta$ of the rotor 5 of the electric machine 1.

It should be noted that the modules 17, 19, 21 may be hardware and/or software modules. The digital processing could then be carried out by a microprocessor comprised in the electronic circuit 15. Furthermore, the electronic circuit 15 may be comprised in the control device 13.

Figure 2:
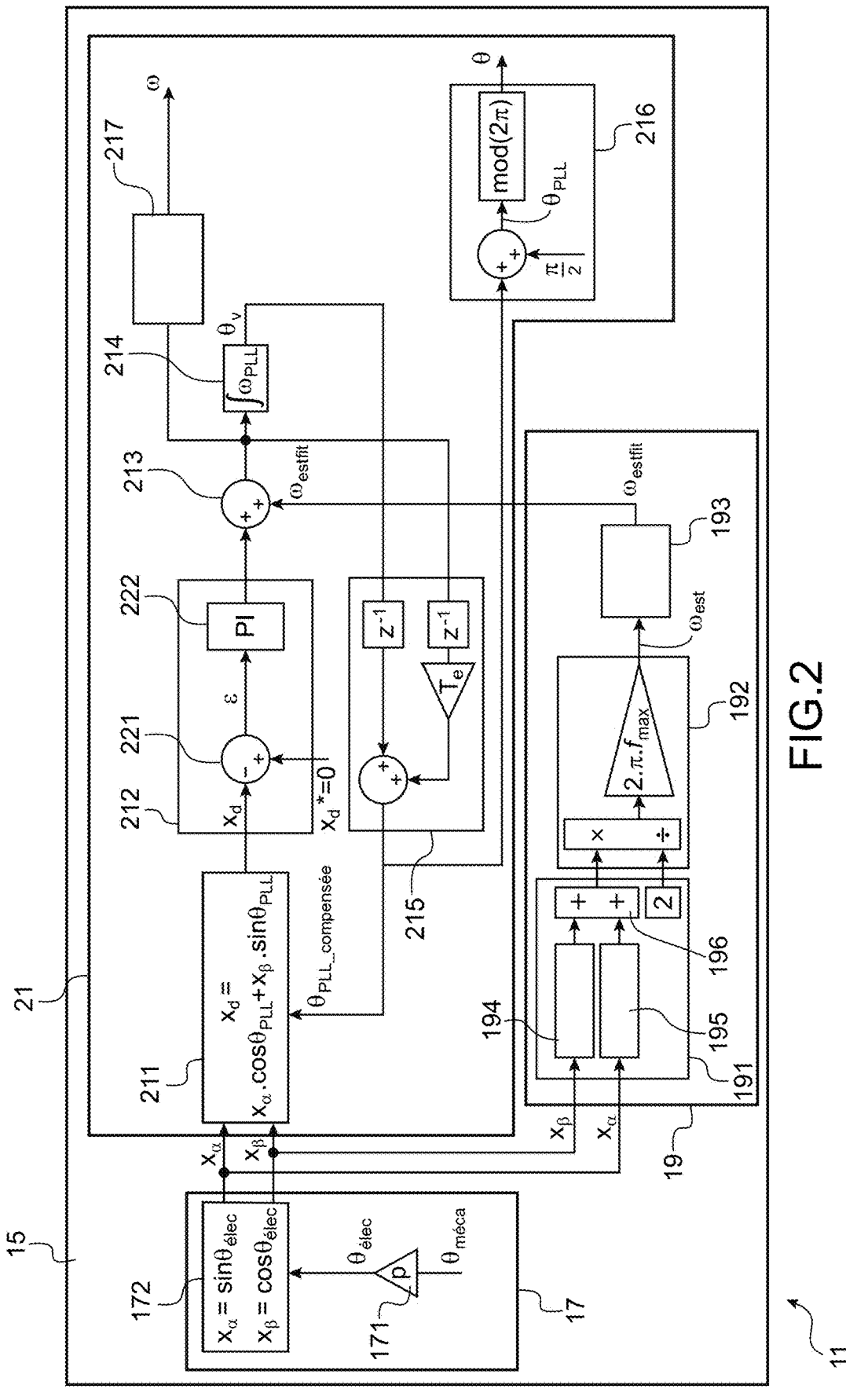
FIG. 2 schematically illustrates a system for determining control parameters, according to a preferred embodiment of the invention

FIG. 2 schematically illustrates a system for determining control parameters, according to a preferred embodiment of the invention.

Like in FIG. 1, the control parameter determination system 11 includes an electronic circuit 15 comprising a two-phase imaginary reference frame module 17, an open-loop module 19, and a phase-locked loop module 21.

The two-phase imaginary reference frame module 17 includes a multiplier element 171 and an ortho-normalization element 172. The multiplier element 171 multiplies the mechanical position signal $\theta_{\overline{a}aaa}$ derived from the position sensor 9 by the number of p pole pairs of the electric machine 1. At the output of this multiplier element 171, an estimate of an electrical position, so-called the estimated electrical position $\theta_{\overline{a}aaa}$ in radians, of the angular position of the rotor is obtained:

$$\theta_{elec} = p \cdot \theta_{meca}$$

The ortho-normalization element 172 then calculates, from the estimated electrical position $\theta_{\overline{a}aaa}$ two sinusoidal signals normalized and shifted from each other by 90° thereby forming two imaginary two-phase signals ($x_\alpha$, $x_\beta$):

$$\begin{cases} x_\alpha = \sin\theta_{elec} \\ x_\beta = \cos\theta_{elec} \end{cases}$$

The two imaginary two-phase signals ($x_\alpha$, $x_\beta$) form a two-phase imaginary reference frame forming input data for the open-loop 19, and phase-locked loop 21 modules.

The open-loop module (symbolized "flt") 19 includes three units: a pulse generation unit 191, an average value generation unit 192 and a selective filter unit 193.

The pulse generation unit 191 is configured to generate two pulse signals at the zero crossings of the imaginary two-phase signals ($x_\alpha$, $x_\beta$). More particularly, this pulse generation unit 191 includes first 194 and second 195 detection elements and an addition element 196.

The first 194 and second 195 detection elements are configured to generate, at the zero crossings of their respective input signals $x_\alpha$ and $x_\alpha$, pulses whose duration is inversely proportional to a maximum useful electrical frequency $f_{max}$ associated with a maximum rotational speed of the electric machine 1.

Each zero crossing detection is encoded so that, at the output of the first 194 and second 195 detection elements, first and second pulse signals are obtained $edges_{x_\alpha}$, $edges_{x_\beta}$ respectively.

An example of encoding is given hereinbelow for the case of the first pulse signal $edges_{x_\alpha}$, knowing that the encoding is similar for the second pulse signal $edges_{x_\beta}$.

At the beginning, the sinusoidal signal at the input $x_\alpha$ is transformed into a square wave signal varying between 0 and 2, such that the maximum value 2 indicates a positive alternation of the sinusoidal signal $x_\alpha$ and the minimum value 0 of the square wave signal indicates a negative alternation of $x_\alpha$, as follows:

$$\begin{cases} \text{square} = 2, \text{ if } x_\alpha > 0 \\ \text{square} = 0, \text{ if } x_\alpha < 0 \\ \text{square} = 1, \text{ if } x_\alpha = 0 \end{cases}$$

Afterwards, the changes in the rising and falling edges of the square signal are detected and interpreted by pulses with a period $\Delta t$, equal to:

$$\Delta t = \frac{1}{2f_{max}}$$

More particularly, each of the first 194 and second 195 detection elements includes two rising-edge and falling-edge monostable circuits (not illustrated) so that the square signals are injected into these two monostable circuits.

For example, the rising-edge monostable circuit is defined in relation with a sampling period $T_e$, as follows:

$$\begin{cases} \text{if } y > (-T_e), \text{ then } edges_{rising\,alpha} = 1 \\ \text{otherwise}, \quad edges_{rising\,alpha} = 0 \end{cases}$$

where $y=k-T_e$ and where the value k is defined according to the value of a binary variable u, as follows:

$$\begin{cases} \text{if } u \neq 0, \text{ then } k = \dfrac{1}{2f_{max}} - \varepsilon \\ \text{if } u = 0, \quad \text{then } k = z^{-1} \cdot y \end{cases}$$

Furthermore, the following truth table (Tab 1) allows deducing the value of the binary variable u:

TABLE 1

| $a = Z^{-1}\cdot\text{fronts}_{montantsalpha}$ | $b = \begin{cases} 1, & si\ \text{square}_{alpha} > Z^{-1}\cdot\text{square}_{alpha} \\ 0, & si\ \text{square}_{alpha} \le Z^{-1}\cdot\text{square}_{alpha} \end{cases}$ | $u = a\ \text{ET}\ b$ |
|---|---|---|
| 0 | 0 | 0 |
| 0 | 1 | 0 |
| 1 | 0 | 0 |
| 1 | 1 | 1 |

It should be noted that the logic of the falling-edge monostable circuit is equivalent to the rising-edge monostable circuit. The only difference lies in the calculation of the binary parameter "b" which becomes as follows:

$$b = \begin{cases} 1, & \text{if } z^{-1}\cdot\text{square}_{alpha} > \text{square}_{alpha} \\ 0, & \text{if } z^{-1}\cdot\text{square}_{alpha} \le \text{square}_{alpha} \end{cases}$$

The addition element 196 of the generation unit 191 is configured to add the two pulse signals together $\text{edges}_{x_\alpha}$, $\text{edges}_{x_\beta}$. Thus, at the output of this addition element 196, we have a superposition signal ZC:

$$ZC = \text{edges}_{x_\alpha} + \text{edges}_{x_\beta}$$

Moreover, the average value generation unit 192 is configured to determine a preliminary estimate of an electrical speed, so-called the preliminary electrical speed $\omega_{est}$. This preliminary electrical speed $\omega_{est}$ is calculated from the superposition signal ZC and the maximum useful electrical frequency $f_{max}$. More particularly, the superposition signal ZC is multiplied by $2\pi f_{max}$ and divided by 2, according to the following formula:

$$\omega_{est} = ZC \cdot \frac{2\pi \cdot f_{max}}{2}$$

Furthermore, the selective filter unit 193 of the open-loop module 19 is configured to apply a selective band-pass filter on the preliminary electrical speed $\omega_{est}$. At the output of this selective filter 193 and therefore at the output of the open-loop module 19, an estimate of the electrical speed, so-called the open-loop estimated electrical speed, is obtained $\omega_{estflt}$.

Advantageously, this open-loop estimated electrical speed $\omega_{estflt}$ is injected into the direct chain of the position servo-control of the phase-locked loop module 21, thereby improving the dynamics of this module 21.

The phase-locked loop module (symbolized "PLL" for Phase-Locked Loop) 21 is a servo-control loop configured to make the signal of the electrical position converge towards a useful signal of an actual electrical position $\theta$ of the electric machine 1 free of harmonics. This actual electrical position $\theta$ is a filtered image of the position measured by the position sensor 9. The phase-locked loop module 21 is further configured to supply the actual electrical speed $\omega$ of the electric machine also harmonic-free.

According to a first embodiment, the phase-locked loop module 21 includes the following units (or sub-modules): a rotation unit 211, a regulation unit 212, a speed addition unit 213, an integration unit 214, a delay compensation unit 215, a position compensation unit 216, and an active filter unit 217.

The rotation unit 211 is configured to apply a rotation matrix with an angle $\vartheta_{PLL_{comp}}$ to the imaginary two-phase signals $x_\alpha$, $x_\beta$ received from the two-phase imaginary reference frame module 17. This allows extracting a continuous component $x_{\boxed{d}}$ of the imaginary signal according to the axis d of a rotating synchronous reference frame such as a Park reference frame. Thus, the continuous component $x_{\boxed{d}}$ of the imaginary signal can be defined as follows:

$$x_d = x_\alpha \cdot \cos\vartheta_{PLL_{comp}} + x_\beta \cdot \sin\vartheta_{PLL_{comp}}$$

The regulation unit 212 is a proportional integral type regulator applied to the error according to the axis d of the rotating synchronous reference frame. More particularly, the regulation unit 212 includes a servo-control element 221 and a corrector element 222.

The servo-control element 221 is configured to servo-control the continuous component $x_{\boxed{d}}$ of the imaginary signal on the axis d at a zero setpoint $x^*_d$. The deviation $\varepsilon$ between the setpoint $x^*_d$ and the continuous component $x_{\boxed{d}}$ is then:

$$x^*_d - x_d = \varepsilon$$

The corrector element 222 is configured to determine a corrector y based on the deviation between the setpoint $x^*_d$ and the continuous component $x_{\boxed{d}}$. This corrector y is of the proportional integral "PI" type which is expressed according to a deactivated or activated state, as follows:

$$y = K_{p_{PLL}} \cdot (x^*_d - x_d) + T_e \cdot \frac{z}{z-1} \cdot K_{i_{PLL}} \cdot (x^*_d - x_d) + y_0$$

with,

If $\text{Enable}_{PLL} = 0$, then Reset $$= 1 \text{ and } T_e \cdot \frac{z}{z-1} \cdot K_{i_{PLL}} \cdot (x^*_d - x_d) + y_0 = y_0$$

: integrator deactivate

If $\text{Enable}_{PLL} = 1$, then Reset $$= 0 \text{ and } T_e \cdot \frac{z}{z-1} \cdot K_{i_{PLL}} \cdot (x^*_d - x_d) + y_0$$

$$= T_e \cdot \frac{z}{z-1} \cdot K_{i_{PLL}} \cdot (x^*_d - x_d) + y_0$$

: integrator activate and, $y_0 = 0$.

The gains $\{K_{p_{PLL}}, K_{i_{PLL}}\}$ are calculated according to the parameters of the phase-locked loop according to the following two formulas:

$$K_{P_{PLL}} = \frac{2\xi_{PLL} \cdot \omega_{n_{PLL}}}{\widehat{x_\alpha}}$$

$$K_{i_{PLL}} = \frac{\omega_{n_{PLL}}^2}{\widehat{x_\alpha}}$$

The values of these parameters of the phase-locked loop are defined in the following table Tab 2:

TABLE 2

| Parameter | Expression/value | Comment |
|---|---|---|
| $\xi_{PLL}$ | 0.707 | PLL damping factor |
| $\widehat{x_\alpha}$ | 1 | Maximum value of the input signals |
| $f_{s_{PLL}}$ | 15 [Hz] | Example of a cut-off frequency value of the PLL |
| $\omega_{n_{PLL}}$ | $2\pi \cdot f_{s\,PLL}$ [rad/s] | Bandwidth of the PLL in the form of an angular frequency |

The output y of the correction element 222 is a correction (in rad/s) of the electrical speed which is used to obtain more accurate information on the angular position of the shaft 5 of the electric machine 1.

The electrical speed $\omega_{estflt}$ estimated by the open-loop module 19 (based on the detection of zero crossings) is injected as a predictive action "FeedForward" into the direct chain. This FeedForward action has the merit of improving the dynamics of the PLL and enabling the convergence of the loop towards the useful value of speed of the shaft 5 especially when activating the PLL at a non-zero shaft speed (for example, 15,000 rpm).

The addition unit 213 is an adder which is configured to add the corrector y derived from the corrector element 222 to the estimated electrical speed $\omega_{estflt}$, injected from the open-loop module 19. Thus, at the output of the addition unit 213, we obtain an estimate of a phase-locked electrical speed $\omega_{PLL}$:

$$\omega_{PLL} = y + \omega_{est\,flt}$$

Afterwards, the integration unit 214 is configured to integrate the phase-locked electrical speed $\omega_{PLL}$. At the output of the integration unit 214, an estimate of a preliminary angular position $\vartheta_v$ referenced with respect to the signal $x_{[z]}$ is then obtained, as follows:

$$\vartheta_v = T_e \cdot \frac{z}{z-1} \cdot \omega_{PLL} + \vartheta_{v_0}$$

with:
if $\text{Enable}_{PLL} = 0$, then Reset=1 and $\vartheta_v = \vartheta_{v_0}$: integrator deactivate if $\text{Enable}_{PLL} = 1$, then Reset = 0 and $\vartheta_v = T_e \cdot \frac{z}{z-1} \cdot \omega_{PLL} + \vartheta_{v_0}$:

integrator activate and $\vartheta_{v_0} = 0$.

The delay compensation unit 215 is configured to compensate for a delay on the estimate of the preliminary angular position $\vartheta_v$. This delay is compensated by taking account of the rotation of the shaft of the electric machine at the scale of the sampling step used to generate the position used in the rotation matrix. Thus, at the output of the delay compensation unit 215, a compensated angular position is obtained $\vartheta_{PLL_{comp}}$ defined as follows:

$$\vartheta_{PLL_{comp}} = T_e \cdot z^{-1} \cdot \omega_{PLL} + z^{-1} \cdot \vartheta_v$$

Moreover, the unit for compensating the angular position 216 of the shaft of the electric machine 1 is configured to bring the angle estimated by the phase-locked loop back to the reference $x_{[\beta]}$. Indeed, the phase-locked loop is based on the resolution of the following equation:

$$x_d^* - x_d = 0$$

This amounts to solving the following trigonometric equation:

$$x_\alpha \cdot \cos\vartheta_{PLL_{comp}} + x_\beta \cdot \sin\vartheta_{PLL_{comp}} = 0$$

The resolution of this trigonometric equation leads to the following solution (modulo $2\pi$):

$$\vartheta_{PLL} = \vartheta_{PLL_{comp}} + \frac{\pi}{2}$$

This solution gives the actual electric position of the electric machine 1.

Furthermore, the signals derived from this phase-locked loop are canceled when the phase-locked loop is deactivated:

$$\begin{cases} \omega = \text{Enable}_{PLL} \cdot \omega_{PLL} \\ \theta = \text{Enable}_{PLL} \cdot (\vartheta_{PLL}, \text{modulo}(2\pi)) \end{cases}$$

with, $$\begin{cases} \text{Enable}_{PLL} = 0, \text{ if the } PLL \text{ est deactivatee} \\ \text{Enable}_{PLL} = 1, \text{ if the } PLL \text{ est activatee} \end{cases}$$

Advantageously, the phase-locked loop module 21 includes an active filter 217 configured to apply a low-pass active filtering to the phase-locked electrical speed $\omega_{PLL}$ to determine an actual electrical speed $\omega$ of the shaft of the electric machine 1. This filtering is carried out according to the equations hereinbelow:

$$\omega_{PLL_{flt}} = T_e \cdot \frac{z}{z-1} \cdot y$$

and, $y = T_e \cdot \frac{z}{z-1}\left(-a \cdot z^{-1} \cdot y - b \cdot z^{-1} \cdot \omega_{PLL_{flt}} + b \cdot \omega_{PLL}\right)$ With,
$\xi_{flt} = 0.707$, factor d' damping of the second–order filter
$\omega_{n_{flt}}$, cut–off angular frequency of the filter $$a = 2\zeta\omega_{n_{flt}}$$

$$b = \omega_{n_{flt}}^2$$

Figures 3A, 3B, 3C:
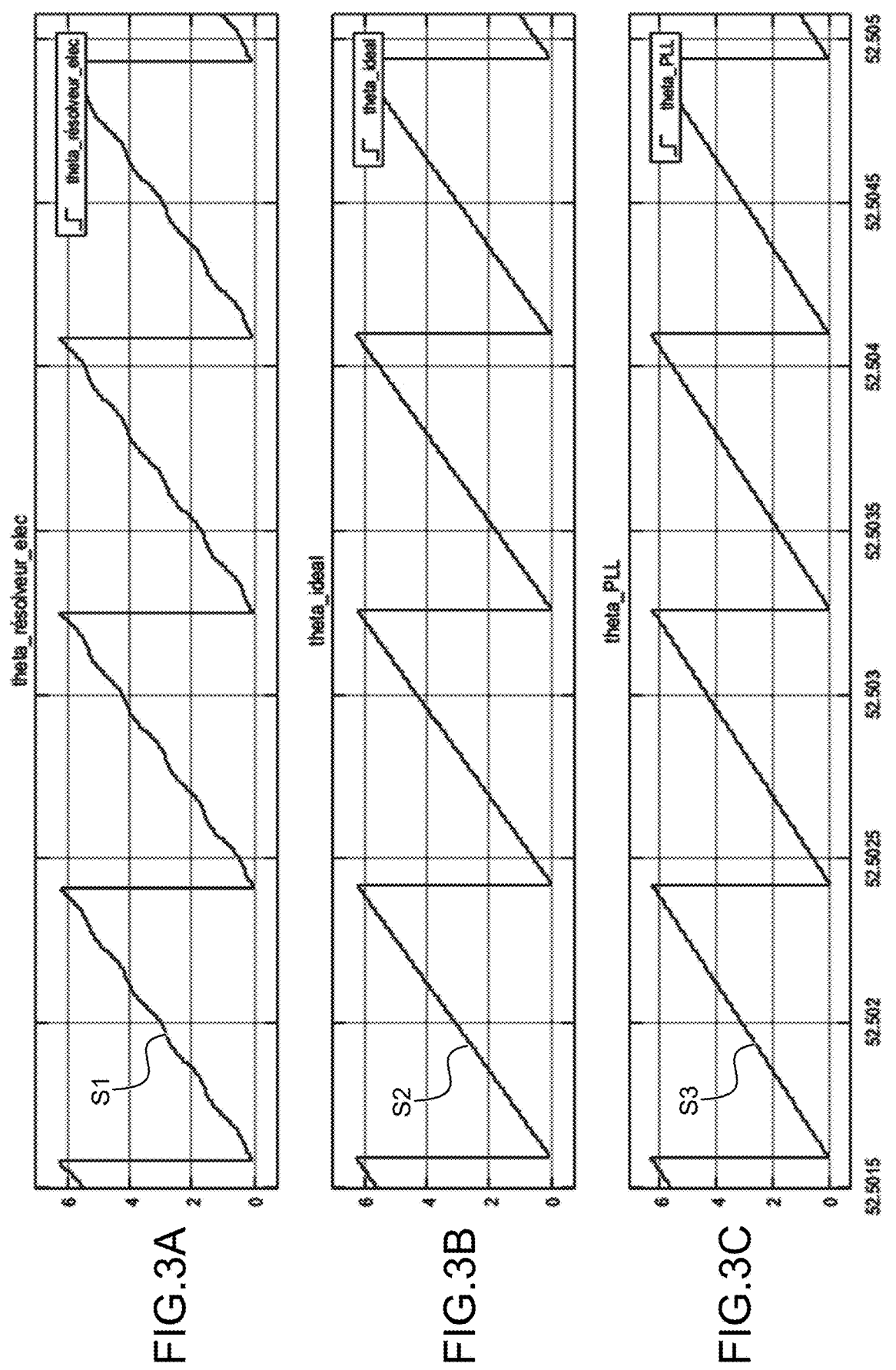
FIG. 3A
FIG. 3B
FIG. 3C are curves showing the result on the position of the electric machine, according to the method of the invention.

FIGS. 3A-3C are curves showing the result on the position of the electric machine, according to the method of the invention.

More particularly, FIG. 3A illustrates the signal S1 derived from the position sensor 9 measuring the position of the electric machine 1. This signal S1 shows the presence of low-frequency harmonics.

FIG. 3B illustrates the theoretical ideal signal S2 of the position of the harmonic-free electric machine 1.

FIG. 3C illustrates the signal S3 of the position of the electric machine 1, as processed by the method or system, according to the present invention. One could notice that this signal S3 is harmonic-free and superposes with the ideal signal S1 in FIG. 3B. This shows the effectiveness of the system and method according to the invention in extracting useful information from a disturbed position measurement.

Figure 4:
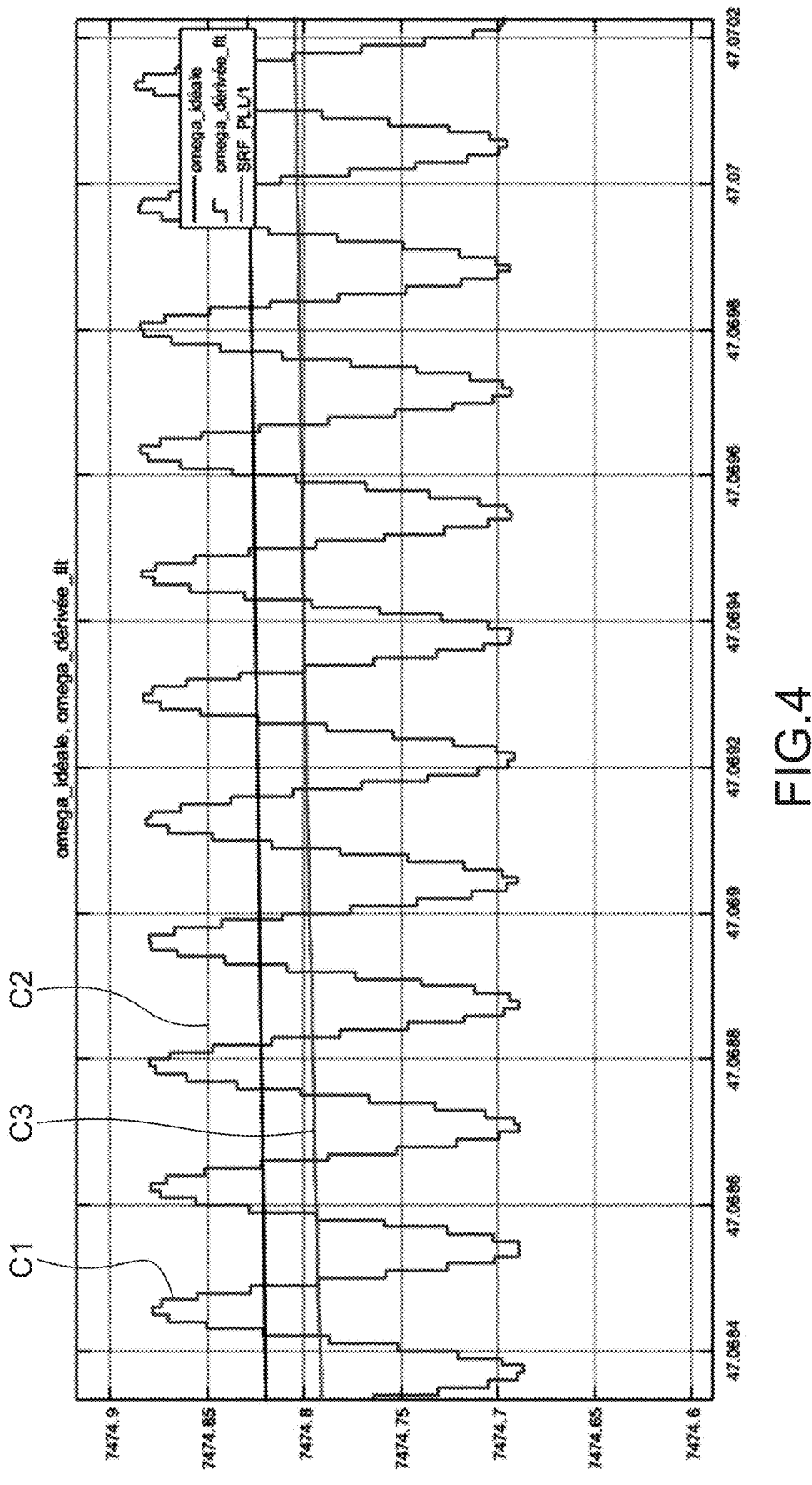
FIG. 4 is a zoom comparing the electrical speed obtained according to the prior art with that obtained according to the method of the invention.

FIG. 4 is a zoom comparing the electrical speed obtained according to the prior art with that obtained according to the method of the invention.

The electrical speed in this figure relates to a starting profile of a turbine over a wide speed range.

More particularly, the curve C1 shows the signal of the electrical speed obtained according to the prior art with a filtered derivative applied to the position measurement. The curve C2 shows the ideal theoretical signal of the electrical speed if the measured position was harmonic-free. The curve C3 shows the signal of the electrical speed obtained according to the method of the present invention. The appearance of the curve C3 is identical to that of the ideal curve C2 showing the effectiveness of the harmonic filtering. Furthermore, the curve C3 is only very slightly offset from C2 showing the minimization of the attenuation of the electrical speed according to the present invention.

Figure 5:
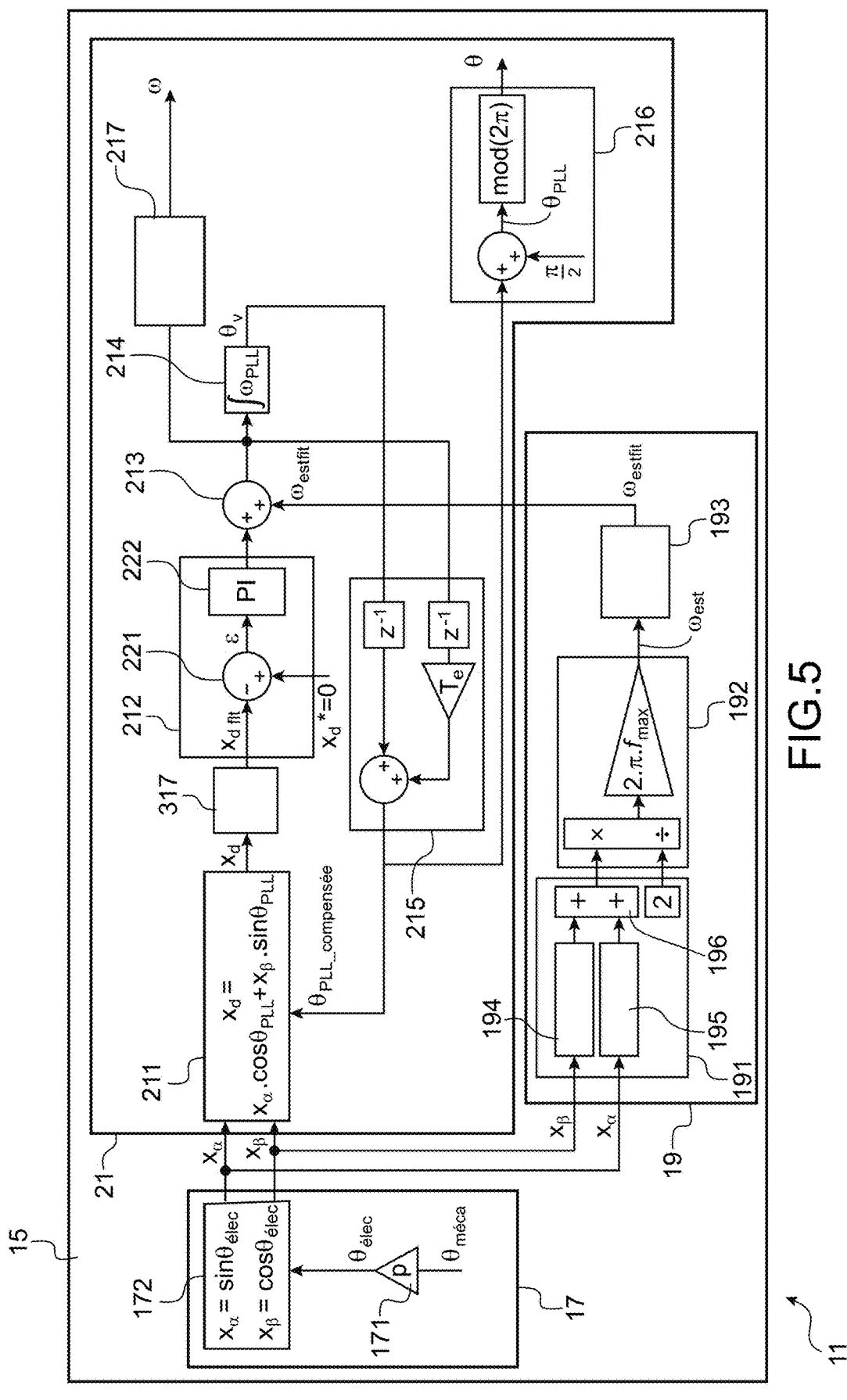
FIG. 5 and FIG. 6 schematically illustrate systems for determining control parameters, according to the second and third preferred embodiments of the invention.

FIG. 5 schematically illustrates a control parameter determination system, according to a second preferred embodiment of the invention.

This second embodiment differs from that of FIG. 2 only by the fact that it includes a selective band-pass active filter applied on the continuous component $x_{\bar{d}}$ (of the imaginary signal according to the axis d of the rotating synchronous reference frame) at the input of the phase-locked loop. In this case, the low-pass active filter 217 of FIG. 2 is removed. Indeed, the actual electrical speed ω according to this second embodiment corresponds to the phase-locked electrical speed $ω_{PLL}$.

Figure 6:
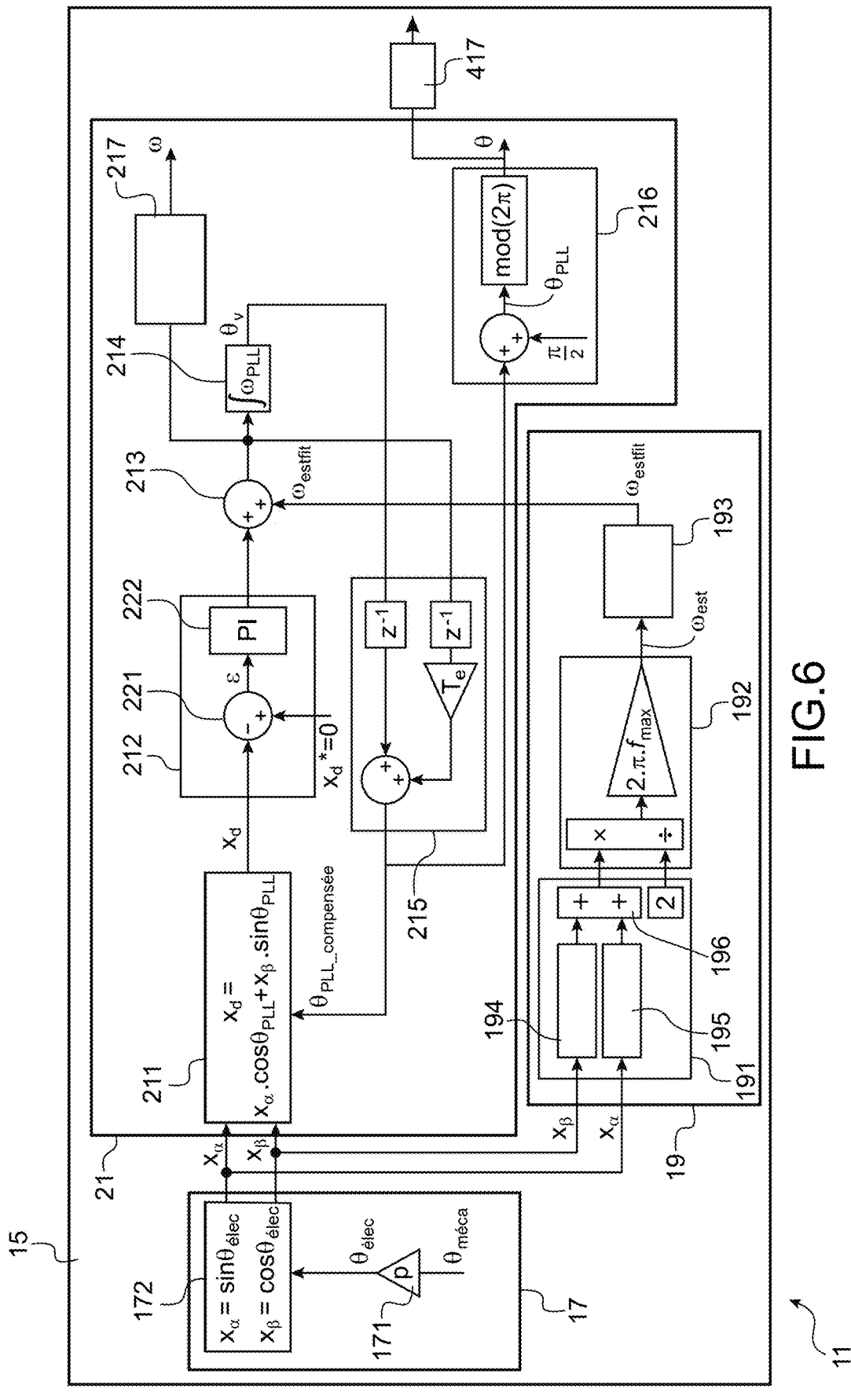

FIG. 6 schematically illustrates a system for determining control parameters, according to a preferred third embodiment of the invention.

This third embodiment differs from that of FIG. 2 only by the fact that it includes a speed observer 417 applied to the signal of the actual electrical position of the electric machine. The speed observer 417 is configured to obtain an image of the filtered electrical speed. In this case, the low-pass active filter of FIG. 2 is removed. The actual electrical speed ω according to this third embodiment corresponds to the image obtained by the speed observer.

Thus, the present invention allows attenuating, and even eliminating, the harmonics. Furthermore, it allows preserving the accuracy and the integrity of the position measurement by avoiding shifting or attenuating the signals. It does not generate any additional phase shift between the measured position of the axis of the rotor and the digitally processed position. In addition, it allows calculating harmonic-free and attenuation-free position and speed control signals or data. These control data, which is used as input data for the control unit, then enable a very stable and very accurate piloting of the electric machine.

The invention claimed is:

1. A method for determining control parameters of a rotating electric machine, including the following steps:

measuring the mechanical position $θ_m$ of the axis of a rotor of the electric machine, constructing two imaginary two-phase signals ($x_α$, $x_β$) based on the measurement of said mechanical position, generating two pulse signals at the zero crossings of said imaginary two-phase signals ($x_α$, $x_β$), determining a preliminary estimate of an electrical speed, the preliminary electrical speed $ω_{est}$, from the sum of said two pulse signals and an electrical frequency $f_{max}$ associated with a rotational speed, determining an open-loop estimated electrical speed $ω_{estflt}$ by applying a selective band-pass filter on said preliminary electrical speed $ω_{est}$ injecting said two imaginary two-phase signals ($x_α$, $x_β$) and said open-loop estimated electrical speed $ω_{estflt}$ into a phase-locked loop, and generating, by said phase-locked loop, the actual electrical position θ of the electric machine.

2. The method according to claim 1, wherein the measurement of the mechanical position $θ_{meca}$ is carried out by a position sensor mounted on the shaft of the electric machine.

3. The method according to claim 1, wherein the construction of said two imaginary two-phase signals includes the following steps:

calculating an estimate of an electrical position, the estimated electrical position $θ_{elec}$, by multiplying the mechanical position $θ_{meca}$ by the number p of pole pairs of the electric machine, and calculating from said estimated electrical position $θ_{elec}$, two sinusoidal signals normalized and shifted from each other by 90° thereby forming said two imaginary two-phase signals.

4. The method according to claim 1, wherein the determination of said two pulse signals includes the following steps:

transforming the two imaginary two-phase signals into square signals with a predetermined width, and generating said two pulse signals by detecting changes in the rising and falling edges of said square signals.

5. The method according to claim 1, wherein the generation, by said phase-locked loop, of the actual electrical position θ of the electric machine includes the following steps:

applying a rotation matrix to the imaginary two-phase signals $x_α$, $x_β$ to extract a continuous component $x_d$ of the imaginary signal according to the axis d of a rotating synchronous reference frame, servo-controlling the continuous component $x_d$ at a zero $x^*_d$ setpoint, determining a corrector y based on the deviation between said setpoint and said continuous component, determining an estimate of a phase-locked electrical speed $ω_{PLL}$, by adding said corrector y to the electrical speed estimated $ω_{estflt}$ by the open loop, determining an estimate of a preliminary angular position $ϑ_v$ by integrating said phase-locked electrical speed $ω_{PLL}$, and determining the actual electrical position of the electric machine by compensating for a delay in the estimate of the preliminary angular position $ϑ_v$ of the shaft of the electric machine.

6. The method according to claim 5, furthering including determining an actual electrical speed $\omega$ of the electric machine by applying low-pass active filtering to the phase-locked electrical speed $\omega_{PLL}$.

7. The method according to claim 5, further including determining an actual electrical speed $\omega$ of the electric machine by applying selective band-pass active filtering on the continuous component $x_d$ of the imaginary signal according to the axis d of the rotating synchronous reference frame, the actual electrical speed $\omega$ then corresponding to the phase-locked electrical speed $\omega_{PLL}$.

8. The method according to claim 5, further including determining an actual electrical speed $\omega$ of the electric machine by applying a speed observer to the actual electrical position of the electric machine, the actual electrical speed $\omega$ then corresponding to an image of the filtered electrical speed obtained by said speed observer.

9. A method for controlling a rotating electric machine comprising determining control parameters according to claim 5.

10. A system for determining control parameters of a rotating electric machine, including:

a two-phase imaginary reference frame module configured to construct two imaginary two-phase signals ($x_\alpha$, $x_\beta$) based on a measurement of the mechanical position $\theta_{meca}$ of the axis of a rotor of the rotating machine received from a position sensor, an open-loop module configured to: generate two pulse signals at the zero crossings of said imaginary two-phase signals ($x_\alpha$, $x_\beta$); determine a preliminary estimate of an electrical speed, said preliminary electrical speed $\omega_{est}$, from the sum of said two pulse signals and an electrical frequency $f_{max}$ associated with a rotational speed; and determine an open-loop estimated electrical speed $\omega_{estflt}$ by applying a selective band-pass filter on said preliminary electrical speed $\omega_{est}$, and a phase-locked loop module configured to generate the actual electrical position $\theta$ of the rotating machine from said two imaginary two-phase signals ($x_\alpha$, $x_\beta$) and using said open-loop estimated electrical speed $\omega_{estflt}$ received from the open-loop module.

11. A device for controlling a rotating electric machine including the system for determining electrical parameters according to claim 10.

12. A rotating electric machine including the control device according to claim 11.

\* \* \* \* \*